(12) United States Patent
McLoughlin et al.

(10) Patent No.: US 12,117,036 B2
(45) Date of Patent: *Oct. 15, 2024

(54) LOCKING DEVICE

(71) Applicants: Peter McLoughlin, Banbury (GB); John McLoughlin, Manchester (GB)

(72) Inventors: Peter McLoughlin, Banbury (GB); John McLoughlin, Manchester (GB)

(*) Notice: Subject to any disclaimer, the term of this patent is extended or adjusted under 35 U.S.C. 154(b) by 25 days.

This patent is subject to a terminal disclaimer.

(21) Appl. No.: 18/141,504

(22) Filed: May 1, 2023

(65) Prior Publication Data

US 2023/0340986 A1 Oct. 26, 2023

Related U.S. Application Data

(63) Continuation-in-part of application No. 17/536,343, filed on Nov. 29, 2021, now Pat. No. 11,692,583.

(30) Foreign Application Priority Data

Dec. 3, 2020 (GB) ...................................... 2019044

(51) Int. Cl.
*F16B 39/24* (2006.01)
(52) U.S. Cl.
CPC ..................................... *F16B 39/24* (2013.01)
(58) Field of Classification Search
CPC .............................. F16B 39/24; Y10S 411/957
USPC .................. 411/136, 149, 150, 160, 162, 163
See application file for complete search history.

(56) References Cited

U.S. PATENT DOCUMENTS

| 266,476 | A | * | 10/1882 | Holland | F16B 39/24 411/961 |
| 602,549 | A | * | 4/1898 | Woodall | F16B 39/24 411/957 |
| 797,673 | A | * | 8/1905 | Fish | F16B 39/24 411/957 |
| 871,921 | A | * | 11/1907 | Fish | F16B 39/24 411/957 |
| 954,010 | A | * | 4/1910 | Alt | F16B 39/24 411/138 |
| 971,784 | A | * | 10/1910 | Pfister | F16B 39/24 411/138 |

* cited by examiner

*Primary Examiner* — Flemming Saether
(74) *Attorney, Agent, or Firm* — Merek, Blackmon & Voorhees, LLC

(57) ABSTRACT

A locking washer for use with a screw-threaded fastener (71), said locking device comprising a first disc-like body (12) comprising an annular portion (13) with at least one aperture (15) therein and a central through-hole (14) e.g. a washer having notches (15) open to the outer or inner periphery and at least one further body (25) held in said one aperture (15). The further body may be a shim (22) also having a central hole (24) and at least one tab (25) extending through the notch (15) and has an end portion which juts above adjacent surface of the washer to engage a surface on the fastener when, on tightening of the fastener, deflects within the void of its aperture under tightening of the engaging surface such that under any tendency to loosen, the tab jams against the opposing surfaces and resist loosening of the fastener.

12 Claims, 9 Drawing Sheets

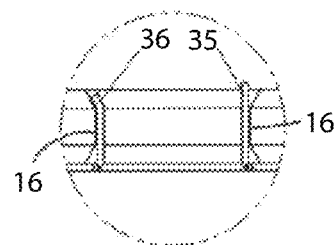
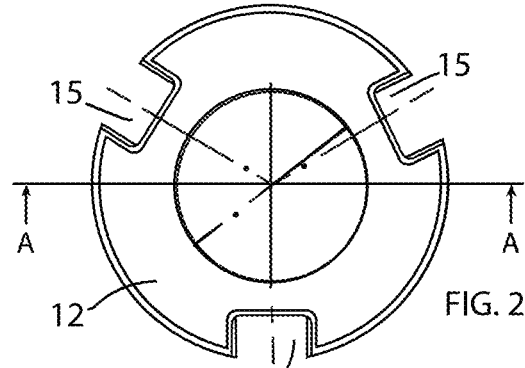
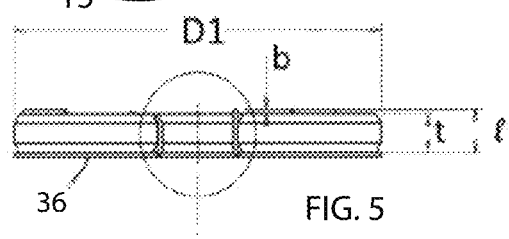
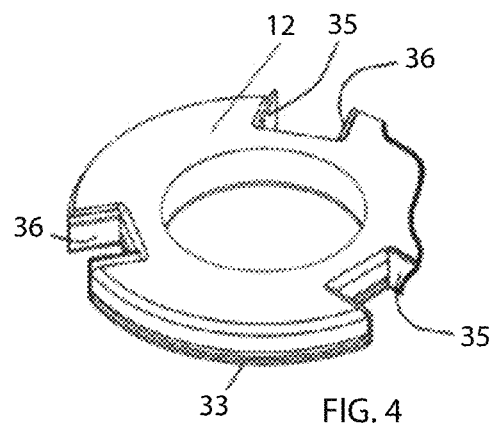

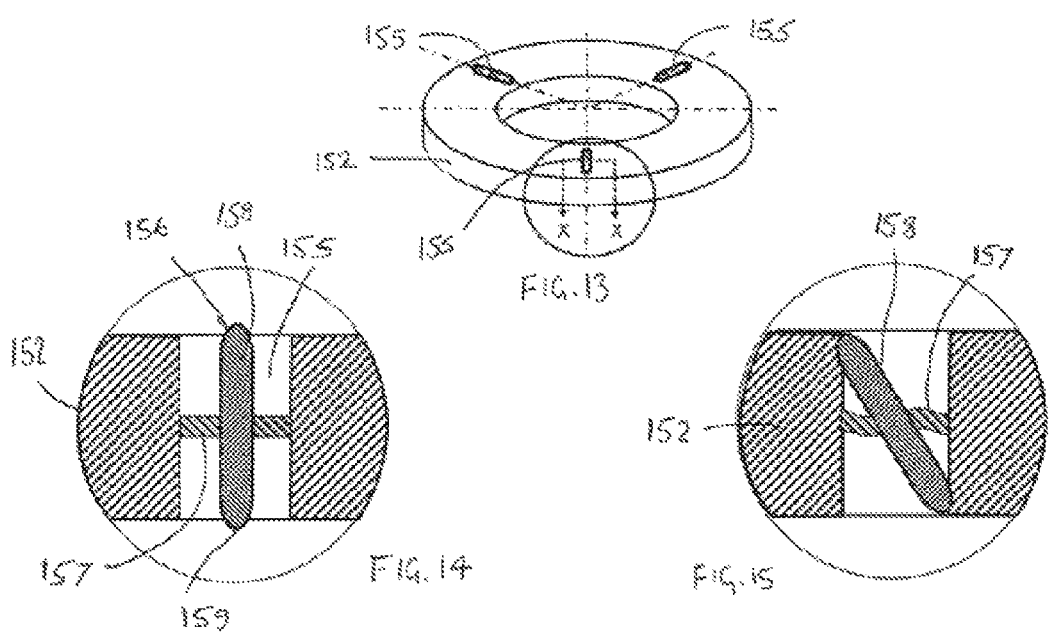

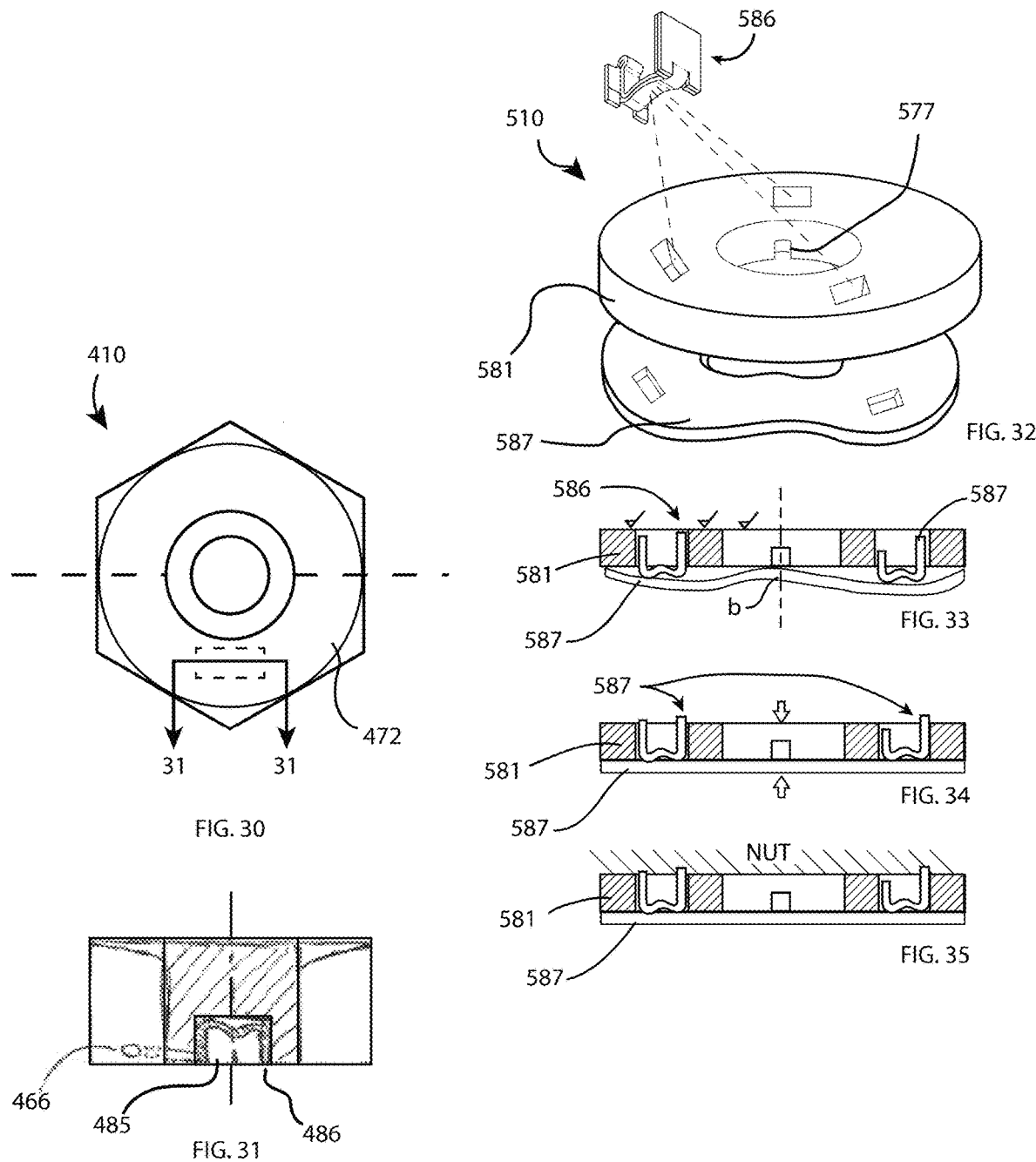

LOCKING DEVICE

CROSS REFERENCE TO RELATED APPLICATIONS

This application is continuation-in-part of application Ser. No. 17/536,343, filed Nov. 29, 2021, entitled A LOCKING DEVICE, which claims priority to UK Application Ser. No. GB2019044.3, filed Dec. 3, 2020, both of which applications are incorporated herein by reference.

FIELD

This invention relates to locking devices, in particular washers, for use with screw-threaded fasteners to help prevent their undesired loosening during use.

BACKGROUND OF THE INVENTION

Locking or lock washers are well known, see for example U.S. Pat. No. 1,782,387 which discloses a shaped annular washer having radially projecting fingers that distort when squeezed between a screw head and fastening surface. Other types of washer comprise two annular bodies with an upper body adjacent the screw head and a lower body adjacent the fastening surface of the member to be secured, for example US2004131443(A1), US2007110542 (A1) and U.S. Pat. No. 9,732,782 (B). All the devices include sets of locking teeth on at least one of the annular bodies to engage with at least one of the surfaces between which the washer is squeezed on tightening of the fastener. These devices including the serrated sets of rigid teeth rigid teeth typically of a harder material than either the fastener head or the workpiece so as to dig in to or indent the material of the fastener head or workpiece and are relatively expensive to manufacture and limited in their effectiveness.

OBJECT OF THE PRESENT INVENTION

The object of the invention is a simplified locking device is to prevent the unwanted reduction of clamping load of threaded fasteners in use particularly in conditions of severe vibration even when the substrate surface is smooth and/or harder than the material from which the locking washer is formed.

SUMMARY OF INVENTION

According to the present Invention, there is provided a locking device for use with a screw-threaded fastener, said locking device comprising at least a first disc-like body comprising an annular portion with at least one aperture therein and a central through-hole and at least one further body held in said one aperture, the further body having a least one projection extending through the one aperture and having an end portion jutting above adjacent surface of the disc-like body to engage an adjacent planar surface on the fastener when compressed on tightening of the fastener so that the projection deflects within the void of the aperture in which it is located under the influence of the tightening of the engaging surface such that under any tendency to loosen, the tab jams against the opposing surfaces and resists loosening of the fastener.

Preferably there are at least two spaced apertures in the annular portion, the apertures being preferably equiangularly spaced apart around the annular portion.

The further body may comprise at least one deformable clip, each having at least one projection jutting beyond the adjacent surface of said disc-like body. Each clip may be a U-shaped or W shaped clip having two arms, one of which projects beyond the surface of the disc-like body to contact the surface of the fastener.

The further body may comprise a second disc-like body concentric with the first disc-like body and having an annular portion with a central through-hole, the annular portion of the second body having at least one upstanding projection formed by a tab integral with the annular portion and extending through an aperture to contact the surface on the fastener. The second body may be in the form of at least one shim which is relatively thin, as compared with the base washer.

The spaced apertures may form notches open to a periphery of the disc-like body, typically the outer or inner periphery.

Preferably, the annular portion of said second body has a plurality of tabs each aligned with a respective notch and projecting therethrough.

The tab may be made of two leaves, the leaves curving away from each other and/or dished to cause the leaves to collapse in a predictable and consistent manner.

The tab may be formed of one continuous piece or separate pieces.

More preferably, the annular portion of said second body has a plurality of pairs of tabs, each pair of tabs aligned with a respective notch such that the tabs in each pair engage a side face of each notch and preferably only one tab of each pair projects through the respective notch to contact the fastener. The one tab of each pair may be curved away from its adjacent sidewall. Another form of one tab has a curved upper end of which is accommodated in a recess in the adjacent sidewall.

Yet another form of further body comprises a relatively rigid member such as a blade, rod, strut etc. held in a resiliently held in a support housed in the aperture.

BRIEF DESCRIPTION OF THE DRAWINGS

The invention will be described by way of example and with reference to the accompanying drawings in which:

FIGS. 2 to 6 are views of a second locking device also according to the invention.

FIG. 13 is an isometric view of anther embodiment of a locking device, and

FIGS. 14 & 15 are sections on the line x-x of FIG. 13 showing the operation of the locking device.

FIG. 30 is a top view of a further bolt/nut-mounted embodiment of the invention.

FIG. 31 is a cross-sectional view of the embodiment of FIG. 30 taken along line 31-31.

FIG. 32 is an exploded view of a wavy washer embodiment of the invention.

FIGS. 33-35 are diagrammatic views of the operation of the wavy washer embodiment of FIG. 32.

DETAILED DESCRIPTION OF THE INVENTION

Figure 1:
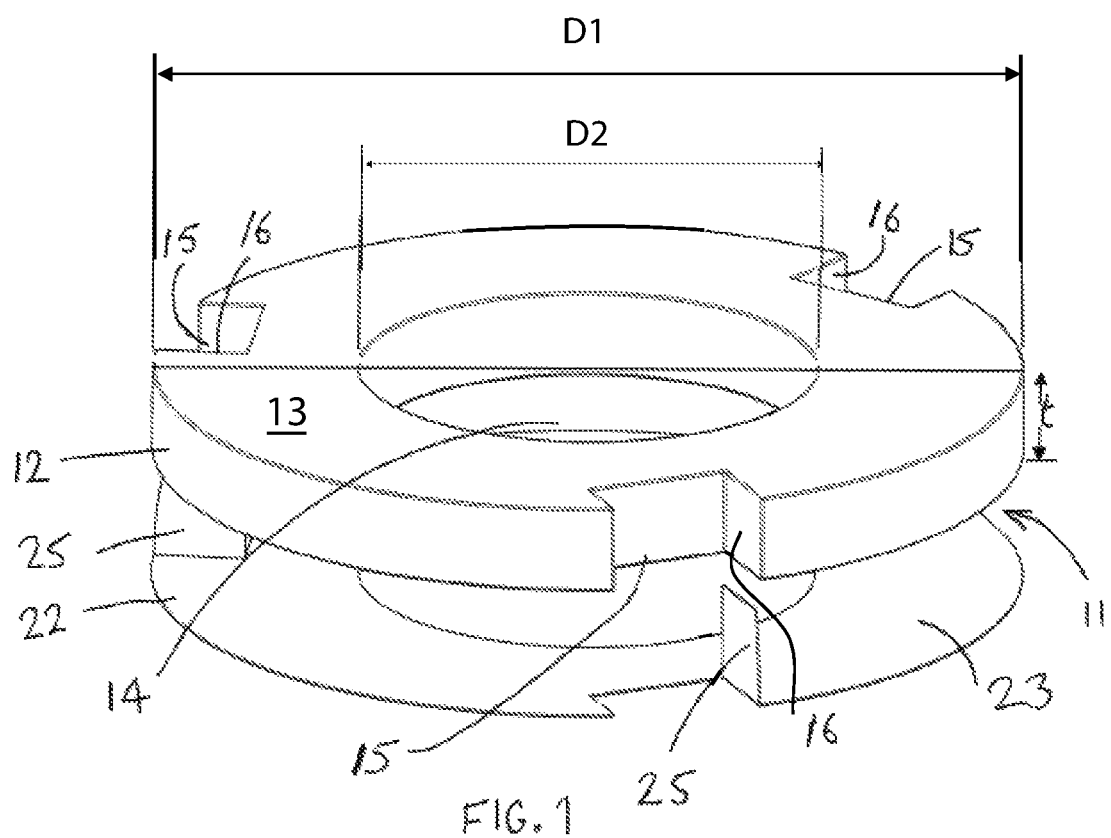
FIG. 1 is an exploded isometric view of a first locking device according to the present invention.

With reference to FIG. 1 of the drawings and according to the present Invention, there is provided a locking device 11 for use with a screw-threaded fastener. The locking device comprising two parts, a first disc-like body 12 in the form of a washer comprising an annular portion 13 with central through-hole 14 which in use accommodates a screw-threaded stud or bolt. (see FIG. 9) and a second part 22 in the form of an annular shim.

The washer 12 has an outer diameter "D1"; the inner diameter "D2" and thickness "t" which may be standardised and has at least one and preferably three equiangularly spaced further apertures 15 in the annular portion 13. The further apertures 15 are in the form of slots or notches spaced around a periphery of the annular portion 13. These notches 15 may be open to the outer periphery of the washer, as shown, having lateral sides 16 with surfaces normal to both surfaces of the annular washer 12. The sides can be parallel with each other or radial of the washer.

The shim 22 is concentric with the washer 12, preferably having an annular portion 23 with a central through-hole 24, the annular portion of the shim having at least one upstanding projection formed by a tab 25 integral with the annular portion 23. One skilled in the art would appreciate that although any shape of the washer may be used, a circular shape or a shape close adhering to the outer periphery of the fastener would be the most practical. The tab 25 extends through a notch 15 in the washer 12 to contact with a fastener, typically a bolt head or nut. The annular portion 23 of said shim, preferably, has a plurality of tabs 25 each aligned with a respective notch 15 and projecting therethrough.

Figure 7B:
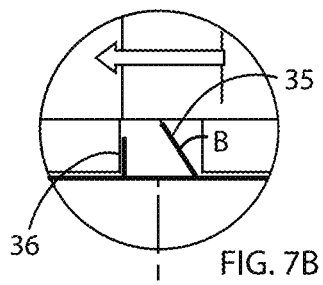
FIGS. 7A-E are schematic views of the projections on the locking device of FIG. 2 during tightening and loosening of the fastener.
Figure 7C:
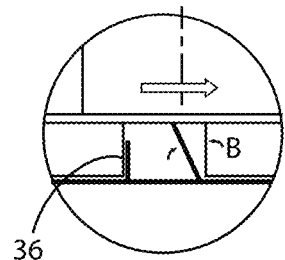
Figure 7A:
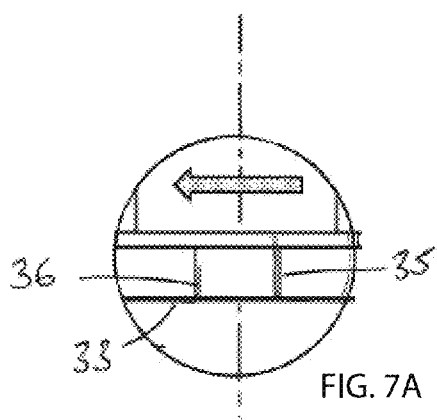
Figure 7F:
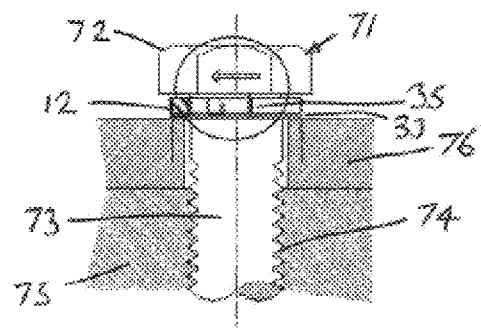

The shim 22 is relatively thin compared to the washer 12 and has tabs 25 that extend axially through the notches 15 to protrude above the adjacent surface of the annular portion 13 of the washer 12, in use to abut an adjacent surface on the fastener on tightening of the fastener (see FIG. 7F). The number of tabs 25 will be determined in conjunction with the thickness of the shim 22 and empirically according to the desired unclamping torque. Tab 25 is of a length "T" which is greater than the thickness "t" of the main washer 12 such that it protrudes a small amount, "b", [to be determined empirically] beyond the adjacent surface of the main washer. The greater number of notches and the thicker the shim, the higher the unclamping torque as the tab must be distorted or deformed beyond the point of jamming to loosen the fastener.

The thickness of the tab 25 can be built up from one or more leaves laminated together to from the tab (not shown).

With reference to FIGS. 2-6, there is shown a second embodiment of the invention also comprising a washer 12 as is shown in FIG. 1. The washer 12 co-operates with a shim 33 which has pairs of raised tabs 35, 36, also equiangularly spaced around the periphery and which each engage in a respective slot 15 in the main washer 12. The two tabs 35, 36 locate against the lateral sides 16 of the respective notches 15 to secure the shim 33 in place. The tab 36 is of length not greater than the full thickness T of the washer 12 and sits below the surface of the washer. The tab 36 may be configured to hold the shim 33 to the washer 12 as shown in FIG. 6. The other tab 35 projects through its respective notch 15 and its distal end portion juts above the adjacent surface of the washer.

Now with reference also to FIGS. 7A-F, there is shown a screw-fastener 71 having a hexagonal head 72 and a shank 73 which engages a screw-threaded hole 74 in a component 75. Other suitable shaped heads or nuts may be used. The embodiment shows the arrangement for a right-hand (or clockwise) threaded fastener. In the case of left-hand threaded fasteners, the relative positions of the raised tabs would be on the opposite faces of the peripheral slots.

The fastener 71 when tightened holds a second component 76 fast with the component 75. As the fastener is tightened, the mating surface of the threaded fastener makes contact with the tip of tab 35 as can be seen in FIG. 7A. Further rotation of the fastener 71 causes the tab 35 to deflect in the direction of the fastening movement, as shown in FIG. 7B, through an angle which is greater than the helix angle of the thread but lower than the limit of the "jamming angle" of the tab. (The "jamming angle" is the limiting angle between two bodies in which the application of a force at an angle to the normal of the contacting surfaces produces a wedging action and binds the two bodies, thereby preventing sliding, because the force required parallel to the two mating surfaces produces, through the resolution of forces at the contact edge, a greater locking load than a sliding load. It can be demonstrated by resolution of forces that the "Jamming Angle" occurs when the tangent of the angle of inclination of the vertical force is lower that the coefficient f friction [$\mu$]) of the engaging surfaces. Typically, the angle of inclination ß of the tab 35 from the vertical for the locking washer 11 would be greater than 5° but less than 30°.

Figure 7D:
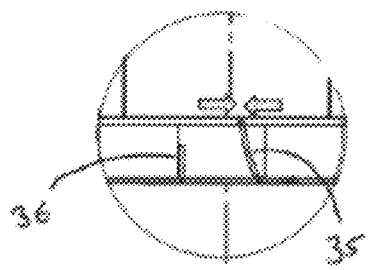
Figure 7E:
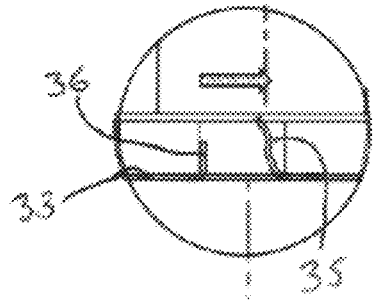

As the fastener 71 tends to rotate in the untightening sense (see FIG. 7C), the contact friction, combined with the elasticity of the tab 35 on the contact surface between the shim 33 and fastener 91, causes the tab 35 to tend to return to its initial at-rest position at a rate greater than the thread helix angle will allow, thus applying a jamming force on the thread and thereby preventing the fastener from further undesired rotation FIG. 7D. It should be noted that the spring force on the tip of the tab does NOT contribute to the jamming force; it simply ensures there is heavy contact between the tip and the contacting surface. Once jamming is engaged, the spring force does not materially influence the strength of the "grab". Deliberate loosening of the fastener 71 by application of a tool to the head 72 causes the tab 35 to ultimately deform allowing further loosening of the fastener as shown in FIG. 7E and to complete removal of the fastener if required.

Figure 8:
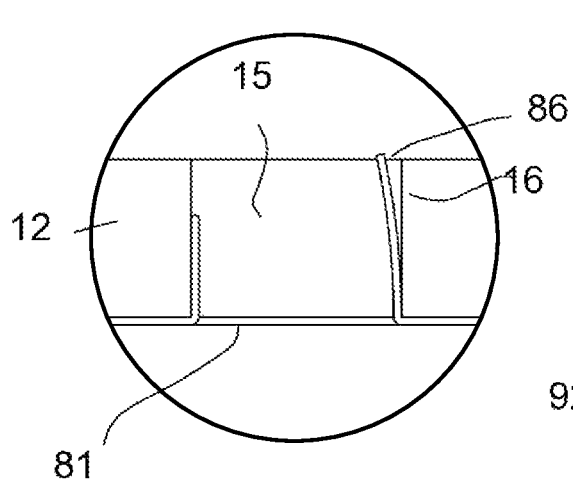
FIG. 8 is another form of deformable clip to that shown in FIG. 2

With reference to FIG. 8 there is shown a shim 81 similar to the shim 33 excepting that the upper portion of the tab 86 is curved away from the lateral sidewall of the notch 15. This ensures that the reaction of the tab 86 is against the side wall 16. This makes for a shorter stiffer tab providing a higher unwinding torque to the tab shown in FIGS. 3-6.

Figure 9:
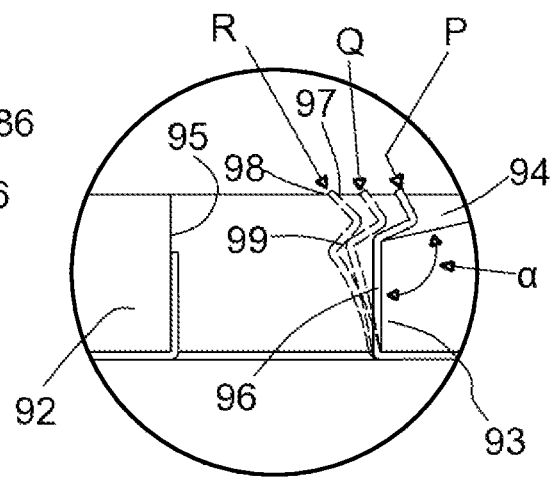
FIG. 9 shows a section through a modified annular first body and yet another form of clip.

Referring now to FIG. 9, there is shown a washer 92 similar to the washer 12 excepting that the notch 95 is provided with an inclined recess 94 which opens into the notch 95 at sidewall 93 adjacent to the tab 96. The recess 94 is also open to the adjacent surface of the washer. The tab 96 lies against its adjacent sidewall 93 and has a shaped end portion 97 accommodated within the recess 94. The end portion 97 is a zig-zag shape with its lower portion 99 having a downward facing surface supported by the recess 94. The recess 94 is inclined at an angle α to the sidewall 93 typically of between 100-120°. The mouth of the recess adjacent the sidewall 93 will have sufficient depth to accommodate the end portion 97 so that it can freely enter onto the recess as it returns to its initial rest position. The tip 98 of the end portion 97 is proud of the washer surface. The tab 96 is shown in different positions P, Q & R during the tightening of the fastener. From a starting position P, the fastener contacts the tip 98 and flexes the fastener to position Q and finally to position R. This will initiate "jamming" as per the above tabs 35 & 86 as the fastener is loosened. This has the advantage of being more generous on manufacturing tolerances. Further unwinding is achieved by application of a tool and causing the tab 96 to buckle.

In another embodiment (not show) the end portion 97 of the tab 96 may be curved in shape instead of zig-zag.

Figure 10:
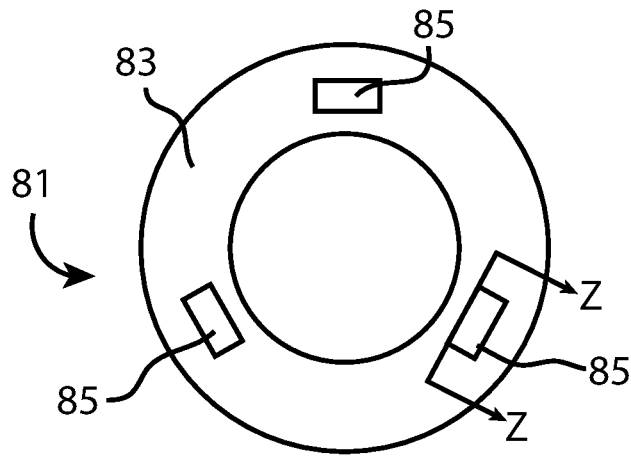
FIG. 10 is a plan view yet another locking device.
Figure 11:
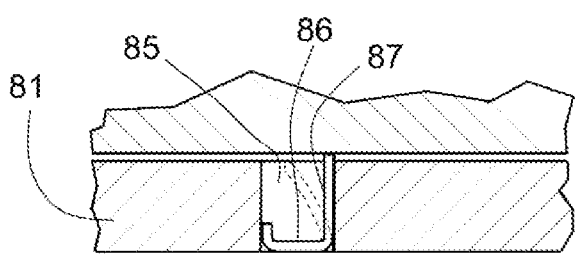
FIG. 11 is a section on the line z-z of FIG. 10.
Figure 12:
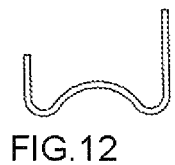
FIG. 12 is a view of an alternative clip to that shown in FIG. 11

Another embodiment of the invention is shown in FIGS. 10 & 11 in which first disc-like body is a washer 81 having three enclosed apertures 85 in the annular portion 83. The further body 86 is deformable clip and is a resilient fit in a respective aperture 85. Each clip 86 has at least one projection 87 jutting above the adjacent surface of said disc-like body. The projection 87 acting in the same way as tabs 25, 35 previously described to jam against the smooth adjacent surface of the fastener. The clip 86 is shown in FIG. 11 as a U-shaped clip and shown in FIG. 12 as a W shaped clip 96 in which the base of the clip has a central corrugation 97.

With reference now to FIGS. 13-15, there is shown a further embodiment of the invention in which the first disc like body is a washer 152 with a planar portion 153 having a plurality of enclosed apertures 155 therein. Preferably there are three equiangularly spaced apertures which are radially aligned in the planar portion, though is not required that that the spacing be equal. A further body 156 is housed in each aperture. Each further body comprises an elastomeric support 157 made from a suitable material e.g. neoprene, chloroprene, and a blade 158 held in the support 157. The blade 158 may be formed from a suitable polymeric material such as a nylon. The blade 158 has curved ends 159 and is longer than the thickness of the washer 152. When used with a fastener the surface on the fastener contacts the projecting end 159 of the blade and the support 157 distorts under further rotation of the fastener so that the blade 158 jams against the smooth surface of the fastener and is flush with the washer surface as shown in FIG. 14. The means of supporting the blade in a resilient manner may also include suitably shaped metallic elements, rather than elastomeric ones, for those applications requiring a temperature resistance beyond their melting or decomposition temperatures.

Further Embodiments—Dual Leaf Tabs

Figure 16:
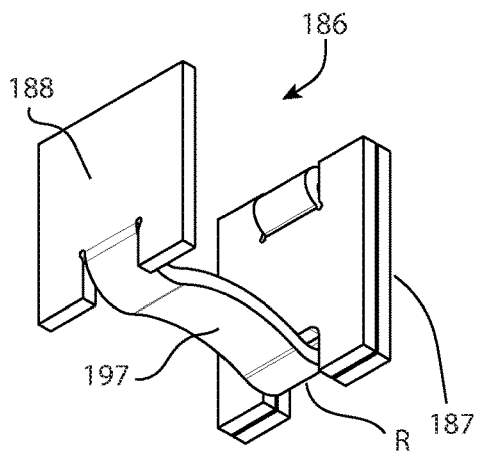
FIG. 16 is a perspective view of a first further embodiment of the invention.
Figure 17:
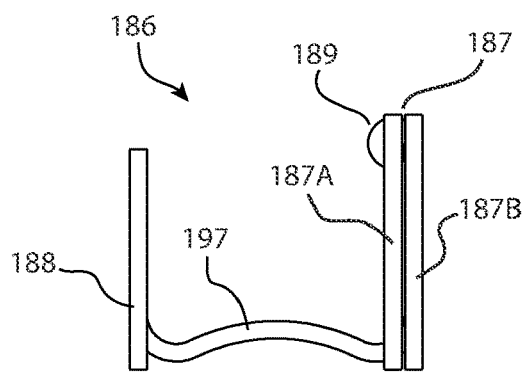
FIG. 17 is a side view of the first embodiment of the invention.

FIGS. 16 through 29 show additional embodiments according to further principles of the invention. The operation and arrangement of these embodiments is similar to the embodiment of FIG. 12. However, the tab on the "projection" side is preferably formed of two leaves or lamina, which may be formed from one continuous piece or material or may be made from two separate leaves arranged to operate together. One of the benefits from the dual-leaf tab configuration is that it may be configured to resist and yield the forces during tightening and untightening of the nut (or bolt) in a predictable, consistent and configurable way as will be described further hereunder Further embodiment 1 is shown in FIGS. 16-22. FIG. 16 is a side view of the clip 186 showing a generally W shaped clip with a pair of raised tabs 187, 188. FIG. 13 is a perspective view of the same clip. The right side shows a raised, dual-leaf projection tab 187 ("projection" or "projection tab") which will project above the upper border of washer to engage a fastener 172 (see FIG. 18). On the left side, the raised tab 188 ("base tab") helps stabilize and/or seat the clip 186. The two sides of the clip may be joined by a corrugation 197 ("spring member") which biases the tabs 187, 188 away from each other to help retain the clip within the aperture 185 (see FIG. 18) and provide a point of rotation "R" for the projection 187 to rotate about. One skilled in the art would appreciate various springs or other devices could be used to join the two tabs together such that the projection tab could move or rotate about the point of rotation R and be retained within the aperture 185 without departing from the scope of the invention. Depending on the application, it is possible that the base tab 188 and corrugation link 197 could be further reduced or eliminated for example by incorporating the projection directly pinned, joined or affixed to the spacer/washer 181 or formed as a part of the washer itself.

The dual portions 187A, 187B ("leaves") of the tab 187 may be joined together by a hinge 186. Preferably the entire clip, including the hinge, is made of one continuous piece of material running from the base tab 188 to the first leaf 187A to the hinge 189 to the second leaf 187B. The hinge preferably has a very low yield force to allow the two tabs 187 to move relative to each other during operation to respond to forces on the projection. One skilled in the art would recognize that instead of two leaves forming the tab, any number of leaves or a single leaf could be used depending on the application and that the dual leaves could be joined by other means including, but not limited to adhesive, welds, rivets, clamps, crimps or other means without departing from the scope of the invention. However, preferably there is no other fixing connection between the two projection tabs, whose abutting faces are in effect free to loosely slide over each other.

Each individual tab may be provided with a slight curvature or bowing such that the abutting (mating) surfaces bow away from each other ensuring that at the point of yield the tabs fail away from each other. Another object of the slight bowing is to ensure a consistent buckling of each tab away from each other so as to ensure a predictable and repeatable yielding force and hence, untightening torque, on the nut or bolt head. The tabs are designed to "give" in opposite directions so as not complicate the loosening process by uncontrolled and unforeseen interference between each leaf.

OPERATION: FIGS. 18-22 show the operation of a clip 186 installed in the aperture of washer 181. As described in reference to the embodiments above, one or more clips could be installed in one or more respective apertures about the washer. One skilled in the art would recognize that the aperture could extend through the washer or be merely a depression ("pocket") (See reference numeral 1855, FIG.

Figure 18:
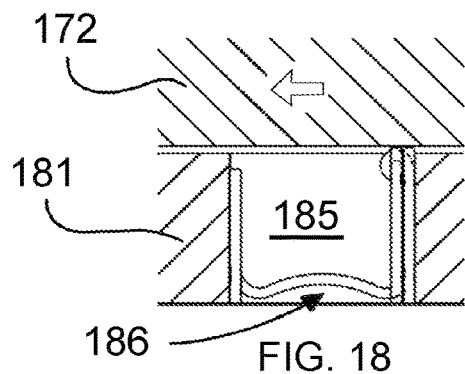
FIGS. 18-22 are diagrammatic views of the first further embodiment in operation.

36) within the washer to retain the clip 186 according to the particular desired application. FIG. 18 shows the projection 187 of the clip making initial contact with the under face of a fastener such as a nut or bolt as the fastener is tightened and begins to apply a bending force to deflect the compound projection tab in the direction of rotation of the nut. The surfaces could be enhanced by the application of an abrasive surface finish to the underside of the washer or the like to increase friction engagement of the surfaces.

Figure 19:
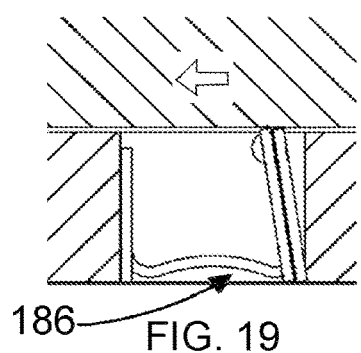

FIG. 19 shows the movement of the projection 187 as the fastener 172 is further tightened. Each individual leaf of the compound tab independently responds to the compound, end point forces (e.g., compression and torque/bending forces) with the two abutting leaf surfaces sliding/rotating relative to each other. Because the two leaves are connected at the top by the hinge, they will act in concert, but the convex curve between them will allow them to move with different, independent motions. Preferably, the small force exerted by the connecting web will be of many magnitudes less than the constraining forces imposed by the untightening tendency of the nut/bolt head on the tips of the compound tab.

Figure 20:
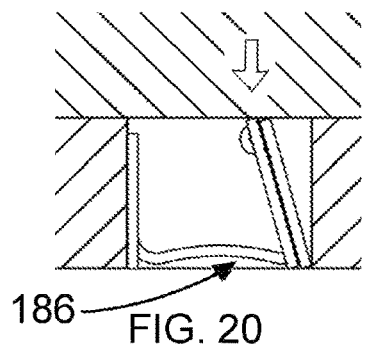

FIG. 20 shows the compound tabs fully deflected, within the limits of the jamming angle with the abutting surfaces further sliding over each other, and rotating about their mutual "earthed" root, namely axis of rotation "R" in the corner of the washer aperture/base body interface under the compressive forces of the fastener 172.

Figure 21:
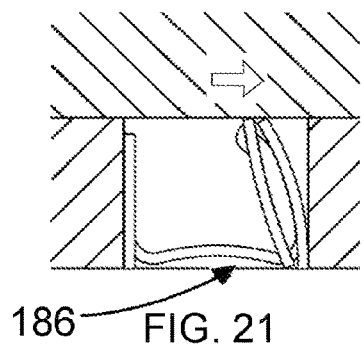
Figure 22:
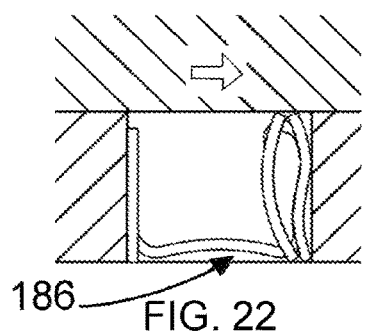

Effects of the nut being unthreaded: FIG. 21 shows the start of incipient opening where the tabs begin to bend in their respective directions away from their mutual centerline, reaching maximum locking effect with the initial tendency to loosening. The load increases as angle β decreases and hence the contact angle at the tip correspondingly decreases and, hence, by triangulation of forces, the load on the tab increases with reducing angle. Because the leaves are mirror images and bend away from each other, they will respond in different ways despite the similar force on each. If the nut were lifted straight upwards, the leaves would likely just reverse the action of tightening. However, the torque applied to the individual leaves of the tab and the friction between the leaves and the nut mean that the leaves will continue to receive MORE compression ("jamming") rather than less. During this compression, the leaves will bow away from each other under the compressive forces.

FIG. 21 shows how the tabs will have to be overcome with the application of an unlocking torque which exceeds the ultimate collapsing load of the tab, beyond which the fastener can be completely disassembled. A weakened crumple zone or other design criteria (such as specific width or strength of material) could be used to facilitate the collapse of the leaves during further compression in a predictable, consistent manner. However, to ensure proper rebounding of the clip during loosening of the nut, the preferred embodiment of the invention does not rely on a crumple zone or plastic deformation in the clip to compress the clip during tightening.

Further Embodiment 2

Figure 23:
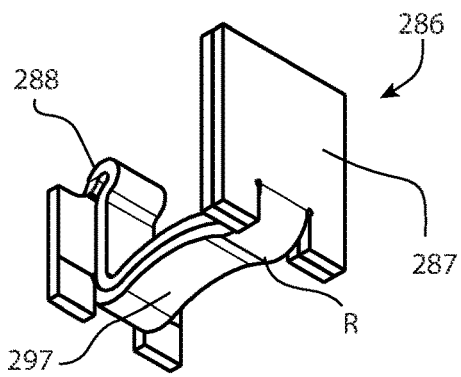
FIG. 23 is a perspective view of a second further embodiment of the invention.
Figure 24:
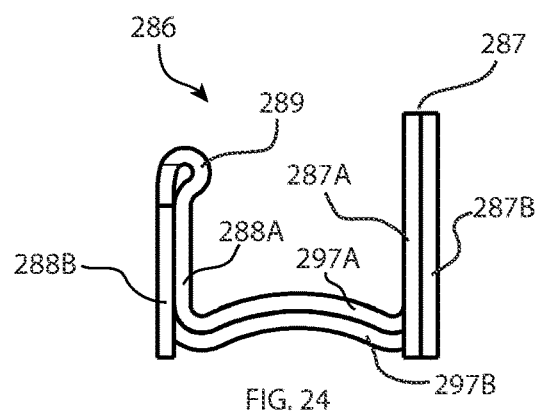
FIG. 24 is a side view of the second further embodiment of the invention.
Figure 25:
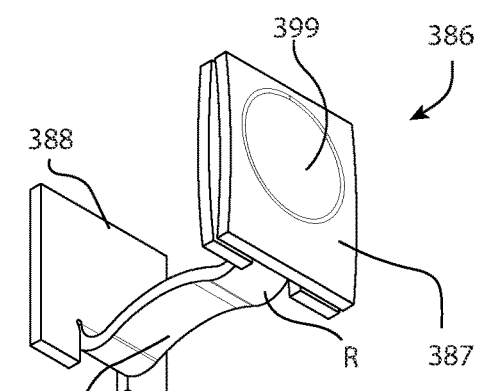
FIG. 25 is a perspective view of a third further embodiment of the invention.
Figure 26:
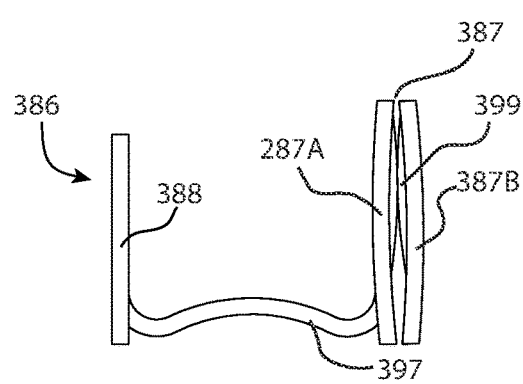
FIG. 26 is a side view of the third further embodiment of the invention.

FIGS. 23 and 24 show a further embodiment of the invention. The clip 286 here has a raised base tab 288 on one side of the clip and a projection tab on the other. As can be seen in FIGS. 23 and 24, the clip is preferably formed as one continuous piece of material running from the first leaf 287A to the hinge 289 along the top piece of the connecting corrugation 297A to the base tab 288A inner leaf through the hinge 289 to the base tab outer leaf 288B to a lower corrugation piece 297B back to the second leaf 287B of the projection tab. To summarize, this configuration is produced from a single strip of material with a fold/hinge being provided in the locating tab of the clip. One skilled in the art would recognize various other configurations of the clip could be used to practice the invention(s) taught within the present application.

The influence, however trivial, of the fold/hinge in Further Embodiment 1 is eliminated in this configuration by removing a fold/hinge between the tab leaves. The tabs in this embodiment are in no way fixed to each other and will therefore be obliged to slide across each other as they severally incline during tightening of the system. Within this configuration, the clip 286 of Further Embodiment 2 will operate in a manner analogous to Further Embodiment 1 as shown in FIGS. 18-22, and the description of its operation is not repeated here. This embodiment further allows the separation of the operating tab from the W spring to allow for greater flexibility on the choice of thickness (strength) of the operating tab and hence the more precise control of the loosening torque.

Further Embodiment 3

FIGS. 25-29 show a Further Embodiment 3. In this arrangement, the clip 386 has leaves 387A, 387B on the projecting tab 387 that are preferably formed as completely separate pieces. The leaves may be provisionally joined for assembly and installation purposes by a frangible or flexible adhesive (not shown) which, during operation, will be released and will have no (or minimal) effect on the ability of the two separate components ("leaves") to slide virtually freely over each other. The leaves may contain dished portions 399 to provide increased stiffness of the operating tab for a given material thickness as well as predictable and repeatable collapsing limits. The elaboration of the slightly bowed and dished 399 tabs does not affect the basic functioning of the system in that the tabs are still free to slide over each other.

Intermediate stages of the operation in this version have been omitted as being analogous from previously explained Further Embodiment 1 above. The advantage of this arrangement is that the strength characteristics of the tab and the elastic restoring forces of the W clip can each be optimized so that the differing requirements of a single clip to provide these characteristics in one material of homogeneous nature is obviated.

Figure 27:
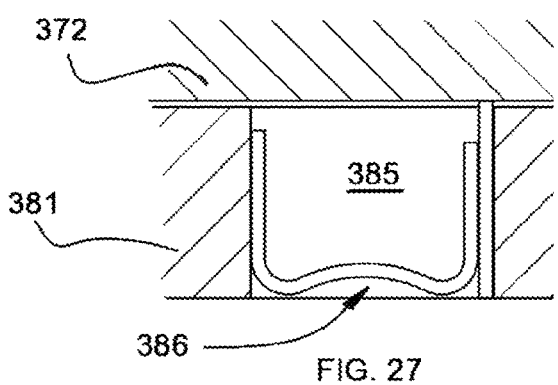
FIGS. 27-29 are diagrammatic views of the third further embodiment in operation.
Figure 28:
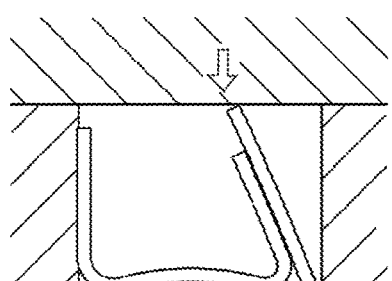
Figure 29:
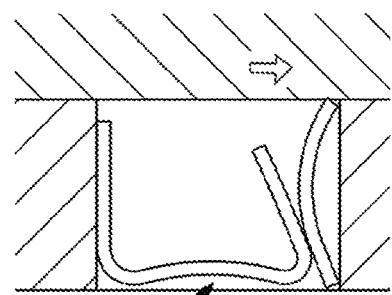
Figure 36:
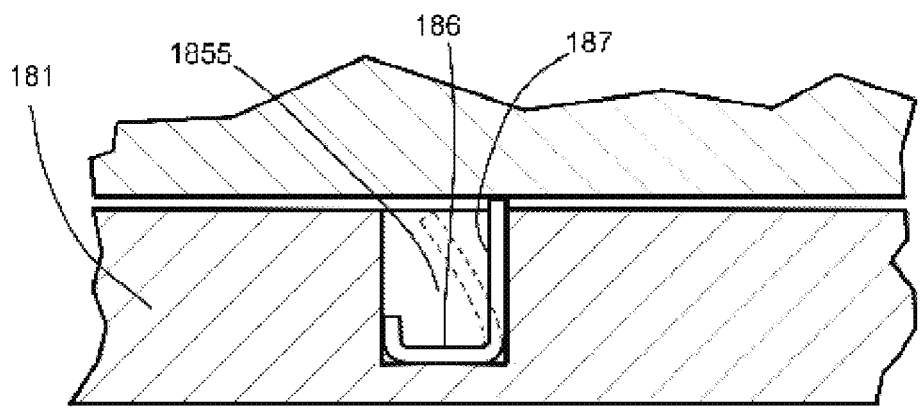
FIG. 36 is a diagrammatic view of the first further embodiment in operation.

FIG. 27 shows a clip 386 installed in a washer 381 beneath a fastener/nut 372 at the point in which the nut (or bolt head or other fastener) makes contact with the projection tab 387. The tab on the W spring ("corrugation") 397, which is in contact with the tab 387, does not need to make contact with the underside of the nut 372. FIG. 28 shows the projection tab 387 (and restoring arm of the W clip) at maximum deflection in the jammed or locked condition. FIG. 28 shows the system fully unlocked by the application of a loosening torque sufficient to overcome the ultimate strength of the tab.

Bolt Contained Embodiment

FIGS. 31 and 32 show an embodiment 410 analogous to Further Embodiments 1-3, but the clip 486 is contained in the bolt or nut 472. The clip is preferably W shaped, but may include any embodiment described above or envisioned by the present invention. FIGS. 31 and 32 show a W shaped clip with an aperture 485. The operation of the clip is the same as above, namely an end of the clip extends above (or below) the nut to engage a surface below the nut, which is preferably the work piece that the bolt is install on or a washer therebetween. One skilled in the art would appreciate that the engagement of the clip could be more effective if a washer used is keyed to the work piece so that the two do not rotate relative to each other.

FIG. 31 shows a partial cross section of the invention along lines 31-31. One feature of the bolt-mounted version is that an access hole has been provided so that at screw may be installed to mechanically engage the projection of the clip 486 to mechanically disengage the mechanically release the tab when required. While this feature may be used on any of the embodiments, it is especially useful on the bolt-mounted version when engaged directly against the workpiece.

It should be noted that a similar arrangement may also be had by reversing the washer of Further Embodiments 1-3, for example, so that the clip engages the work piece ("component") (not shown) instead of the undersurface of the bolt/nut 472. The surfaces may also be enhanced such as by surface abrasion or the like to increase the frictional engagement between the surfaces. Depending on the installation, it may be advantageous to key the bolt and the washer together so that they cannot rotate relative to each other. It may also be necessary to further secure the clip in the washer so that it doesn't fall out. One skilled in the art would appreciate the many diverse mechanical methods that could be used to secure the clip including pins, fasteners, rivets, adhesives, etc. without departing from the scope of the invention. Additionally, it may be desirable to increase the surface area at the bottom of the bolt/nut by providing a flange (not shown) or other device so that the total surface area available at the interface of the nut and work piece 476 is increased.

Wavy Washer Embodiment

A critical feature of the family of devices is the accurate production of an upstand on the Operating Tabs such that the angle of inclination at full compression of the threaded fastener, between the tab tip and the underside of the nut is within the range of Jamming Angles. In all other embodiments, this upstand is subject to the manufacturing dimensional tolerance of two components: the thickness of the base washer and the length of the tab upstand. With modern manufacturing methods, it will be possible to ensure the tolerances such that the angle of reclination is assured. Nevertheless, precision in manufacturing bears a cost and at very small size of threaded fasteners, the dimensions of the device will be correspondingly small and manufacturing tolerances consequently more expensive to achieve.

A secondary benefit of this embodiment is the locking benefits of the wavy washer itself, using the strain force stored in the wavy washer, if it is made stiff enough. The wavy washer concept of locking is known but tests show that it is has shortcomings compared to other classes of locking device. Notwithstanding this shortcoming it would provide a more progressive releasing of the threaded system and afford a degree of vibration damping during the initial stages of separation which would give both audible and visual indications of loosening before final release of the threaded system.

FIG. 32 shows an exploded view of the wavy washer embodiment 510 with the wavy washer 587 located directly beneath the base washer 581 and the disposition of the W-clip (or U-clip) 586 which fits snugly into each aperture with tabs pointing upwards. Preferably a slot 577 and key (not shown) or other alignment device are used to align the washer and base washer. The depth "b" (as described above) of the undulations of the Wavy Washer preferably corresponds precisely to the desired upstand/inclination angle of the Operating tab.

FIG. 33 shows a diagrammatic view of a cross-section of the system loosely assembled with the operating tab protruding slightly (this dimension may be irrelevant to the final dimension of the upstand or function of the device as it is subsequently ground). It should be noted that the diagram is not a true linear cross-section of the washer 581 because it shows two tabs, which would not be aligned in the embodiment of FIG. 32. The diagram is merely intended to show the action of the clips 586 and not necessarily the construction of the washer 581. With the assembly fixed but unloaded, the whole of the top surface of the Base Washer is ground to give the final Base Washer thickness, in the process of which the tip of the W Clip is reduced to exactly coincide with the surface of the Base Washer.

FIG. 34 Shows the effect of loading the base washer/wavy washer combination so as to completely eliminate ("flatten") the undulations, causing each tab to project 587 by substantially the same amount. Thus the clips are pushed further into the aperture of the washer 581 causing the projections 587 on the clip to rise above the washer 581 upper surface.

FIG. 35 Shows the desired effect of the exact angle of reclination of the tab projection 587 in the base washer apertures upon tightening the threaded system against the nut/bolt.

Thus the action of the clip is analogous to earlier embodiments, but the actuation of the clip is enhanced by the action of the wavey washer.

We claim:

1. A locking device for use with a screw-threaded fastener threadedly connected to a work piece, said locking device comprising:
    a first disc-like body coaxial with said fastener, wherein said first body has a central through-hole therethrough and comprising an outer portion defining a plurality of apertures equiangularly spaced along the outer portion and;
    at least one further body having a first and second projection retained in a respective one of said apertures, said first projection being formed of two leaves and extending through the respective one of said apertures and having an end portion jutting above an adjacent surface of the first disc-like body to engage an adjacent planar surface on the fastener or work piece when compressed on tightening of the fastener so that said first projection deflects within the respective aperture in which it is located under the influence of the tightening of the fastener such that under any tendency to loosen, the first projection jams against the adjacent planar surface of the fastener or work piece and resists loosening of the fastener; and
    wherein the first and second projection are aligned with the respective aperture such that the first projection is dimensioned to engage a first side wall of the respective aperture and the second projection is dimensioned to engage a second side wall of the respective aperture.

2. A locking device as claimed in claim 1, wherein only said first projection of said first disc-like body projects through its respective aperture to contact a fastener.

3. A locking device as claimed in claim 1, wherein said first projection and said second projection are one continuous piece of material.

4. A locking device as claimed in claim 1, wherein and each of the two leaves on said first projection are curved away from each other when installed in the aperture.

5. A locking device as claimed in claim 1, wherein said first projection is twice the thickness of the second projection, and said first body has a shape selected from the group of a ring shape, a hexagon, an octagon.

6. A locking device for use with a screw-threaded fastener threaded to a work piece, said locking device comprising:
   a first body coaxial with the fastener; said first body having a central through-hole therethrough and comprising an outer portion defining at least one pocket within the outer portion; and
   at least one further body having a first and second projection retained in a respective one of said pockets, said first and second projection being connected together by a spring member;
   said first projection being formed of two leaves and extending through the respective one of said pockets and having an end portion jutting above an adjacent surface of the first body to engage an adjacent planar surface on the fastener or work piece when compressed on tightening of the fastener so that said first projection deflects within the respective pocket in which it is located under the influence of the tightening of the fastener such that under any tendency to loosen, the first projection jams against the adjacent planar surface of the fastener or work piece and resists loosening of the fastener; and
   wherein the first and second projection are aligned with the respective pocket such that the first projection is adjacent a first side wall of the respective pocket and the second projection is adjacent a second side wall of the respective pocket.

7. A locking device as claimed in claim 6, wherein said first projection, spring member and said second projection are one continuous piece of material.

8. A locking device as claimed in claim 6, wherein said first projection and said second projection are one continuous piece of material.

9. A locking device as claimed in claim 6, wherein said first projection is twice the thickness of the second projection.

10. A locking device as claimed in claim 6, wherein each of the two leaves are curved away from each other when installed in the pocket.

11. A locking device as claimed in claim 6, wherein each leaf is dished in the middle.

12. A locking device for use with a screw-threaded fastener threaded to a work piece, said locking device comprising:
    a first body coaxial with the fastener; said first body having a central through-hole therethrough and comprising an outer portion defining at least one pocket within the outer portion; and
    at least one further body having a first and second projection retained in a respective one of said pockets, said first and second projection being connected together by a spring member, wherein said spring member is W-shaped;
    said first projection extending through the respective one of said pockets and having an end portion jutting above an adjacent surface of the first body to engage an adjacent planar surface on the fastener or work piece when compressed on tightening of the fastener so that said first projection deflects within the respective pocket in which it is located under the influence of the tightening of the fastener such that under any tendency to loosen, the first projection jams against the adjacent planar surface of the fastener or work piece and resists loosening of the fastener; and
    wherein the first and second projection are aligned with the respective pocket such that the first projection is adjacent a first side wall of the respective pocket and the second projection is adjacent a second side wall of the respective pocket.

* * * * *